(No Model.)

J. C. TALLMAN.
RUBBER TIRE.

No. 527,820. Patented Oct. 23, 1894.

WITNESSES:

INVENTOR
J. C. Tallman.
BY
ATTORNEY

UNITED STATES PATENT OFFICE.

JOHN C. TALLMAN, OF BRIDGEPORT, CONNECTICUT.

RUBBER TIRE.

SPECIFICATION forming part of Letters Patent No. 527,820, dated October 23, 1894.

Application filed November 10, 1893. Serial No. 490,594. (No model.)

*To all whom it may concern:*

Be it known that I, JOHN C. TALLMAN, a citizen of the United States, residing at Bridgeport, in the county of Fairfield and State of Connecticut, have invented certain new and useful Improvements in Rubber Tires and Fellies for Vehicle-Wheels; and I do hereby declare the following to be a full, clear, and exact description of the invention, such as will enable others skilled in the art to which it appertains to make and use the same.

My invention relates to rubber tires for vehicle wheels, but has especial reference to the construction of such a tire with its corresponding felly, so that the advantages of a pneumatic tire are obtained without any bad effects from accidental perforation, while at the same time the tire has the characteristic of sustaining great weight without collapsing.

Figure 1:
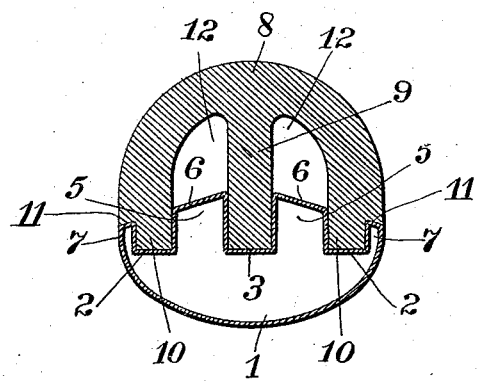
Figure 2:
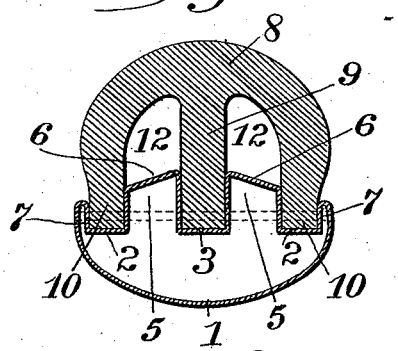
Figure 3:
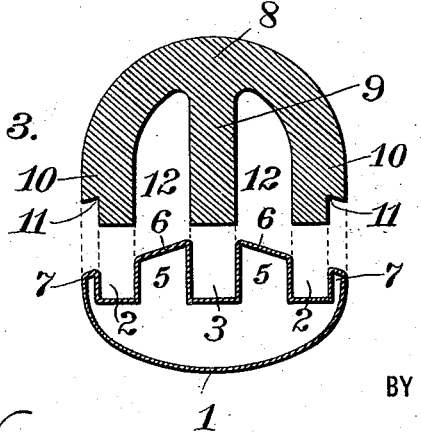

In the accompanying drawings—Figure 1 is a cross section illustrating my improved tire and felly. Fig. 2 is a similar view but showing a slight modification in the construction and shape of the outer lower sides of the tire, and Fig. 3 a sectional view of the tire and felly in detached condition.

Similar numbers of reference denote like parts in all the figures of the drawings.

1 is the felly which is formed by drawing or in any other well known and ordinary manner, and has in its peripheral face continuous and parallel grooves 2, 3.

The ribs 5 on each side of the central groove 3 have their outer edges inclined downwardly and outwardly as seen at 6, while the ribs 7 at the sides of the felly also have their outer edges similarly inclined, the object of which inclines will be presently explained.

8 is the tire made of rubber and having extending centrally from its inner wall a continuous pillar or support 9 adapted to fit closely within the groove 3.

The sides of the tire are shaped to constitute pillars 10 which fit within the grooves 2, the outer lower portion of these pillars 10 being notched as seen at 11 so that they will fit over the inclinations of the ribs 7 to bring the tire flush with the felly.

Between the pillars 9 and 10 are air spaces 12 which lighten the tire and are sufficient to permit of the yielding of the latter after the manner which characterizes the pneumatic tire.

This tire complete is molded in a single piece, and is made of a diameter less than that of the wheel to which it is applied. In applying my tire to a wheel the tire is stretched and sprung into position with the pillars fitting into their respective grooves.

The central pillar 9 is mainly instrumental in sustaining the weight placed on the wheel, and, together with the side pillars 10, effectually prevents the tire from collapsing.

No cement or other means is necessary for retaining the tire in position on the felly, since it will clearly be manifest that any weight placed on the tire will not cause the outer pillars to lift from their grooves. If desired, however, pins may be driven through the felly and the pillars from side to side at several places throughout the circumference of the felly, as shown by dotted lines in Fig. 2.

The outer edges of the ribs are inclined as above set forth in order that the tire, when heavily weighted, may not meet with a solid abutment which would otherwise be presented if these edges were at right angles to the vertical walls of the ribs.

The constructions shown in Figs. 1 and 2 are alike except that in Fig. 1 the tire is flush with the sides of the felly, while in Fig. 2 this is not so, but I prefer the construction shown at Fig. 1 because it gives a neater appearance.

A felly made in the manner shown and described has great strength and is admirably adapted in connection with the tire shown for use on sulky wheels which have to stand considerable more hard usage and strain than bicycle wheels. My improvement, however gives excellent satisfaction when used on bicycle wheels, and contributes comfort and ease and cannot be injured by perforation.

I claim—

A rubber tire comprising two parts, a hollow felly having its periphery provided with a series of parallel circumferential grooves, and ribs on each side of said grooves, having their tops inclined toward the sides of the felly, and a rubber tire having side pillars adapted to fit in the two outside grooves, and a central pillar engaged in the central groove, the said side pillars being recessed to come within the side ribs and air spaces between the side pillars and the central pillar, the outer surface of the tire being designed to contact directly with the ground.

In testimony whereof I affix my signature in presence of two witnesses.

JOHN C. TALLMAN.

Witnesses:
F. W. SMITH, Jr.,
A. J. TANNER.